United States Patent Office 2,884,464
Patented Apr. 28, 1959

2,884,464

PROCESS FOR THE PRODUCTION OF ALLYL SUBSTITUTED ACETYLENE COMPOUNDS

Peter Kurtz, Leverkusen-Bayerwerk, Germany, assignor to Farbenfabriken Bayer Aktiengesellschaft, Leverkusen, Germany, a corporation of Germany No Drawing. Application May 26, 1955
Serial No. 511,406

Claims priority, application Germany May 29, 1954

10 Claims. (Cl. 260—632)

This invention relates to a process for the production of allyl substituted acetylene compounds.

Acetylene hydrocarbons which are substituted by the allyl radical could formerly only be obtained by reacting Grignard compounds of acetylenes with allyl bromide (V. Grignard and L. Lapayre, C.r. 192, 250 (1931)) in ether, or from sodium acetylides with allyl halides in liquid ammonia (R. Lespieau, L. Journeau, Bl. (4) 49, 423 (1931)).

These processes are unsuitable for technical use owing to the high cost of the ether and ammonia used as solvents.

It is an object of the present invention to provide a novel process for the production of acetylene hydrocarbons substituted by an allyl radical. A further object is to provide said compounds in an economical process. Another object is to provide a process for the production of said acetylene hydrocarbons in which the reaction can be carried out in an aqueous medium instead of liquid ammonia or ether heretofore used.

Further objects will appear hereinafter.

In acordance with the present invention it has been found that acetylene and acetylene compounds which contain the —C≡CH group, i.e. compounds of the general formula:

wherein R represents hydrogen or a hydrocarbon radical which in turn may be substituted by other functional groups, may be reacted with halides of the allyl series, i.e. compounds of the general formula:

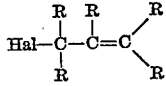

wherein R has the above defined meaning, in the presence of cuprous compounds in aqueous solution, to form allyl substituted acetylene compounds of the general formula:

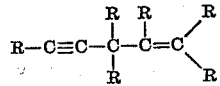

wherein R has the above defined meaning.

Salt solutions, for example sodium chloride solutions, may be used in place of water as solvents for the process according to the invention. The supplementary use of an organic solvent or diluent, for example benzene, ethanol or acetone, may be of advantage in certain cases.

The cuprous compound, for example cuprous chloride, may be added in molar quantities or in catalytic quantities, the latter usually being sufficient. The conditions in the solution should be chosen so as to render the cuprous compound as soluble as possible and so as to promote temporary formation of copper acetylides in the solution. When using cuprous chloride it is advantageous to add for example sodium chloride to the reaction mixture in order to dissolve the cuprous chloride.

The reaction is generally carried out between 30 and 150° C., preferably between 70 and 100° C.

Although the reaction may be carried out in acid medium, it is preferable to carry out the reaction in neutral or alkaline media, since better yields are generally produced under these conditions. For this reason, it is advisable to add alkali so as to fix the acid being liberated in the reaction.

By using the process of the invention, it is possible for the compounds described above to be produced directly from starting materials consisting of an acetylene hydrocarbon and halides of the allyl series. An additional advantage of the process is that water may be used as the solvent. Consequently, the present process is a novel and essentially simplified synthesis for these compounds.

The compounds obtained by the process of the present invention can be used as intermediate compounds for the production of pharmaceutics as described and claimed in the co-pending application Serial No. 511,405, filed on even date, and now abandoned. Furthermore, they are valuable intermediate compounds for dyestuffs and scents.

This invention is further illustrated by the following examples, without, in any way, limiting it.

*Example 1*

750 cc. of an aqueous saturated sodium chloride solution are introduced into a reaction vessel equipped with a reflux condenser, the said vessel incorporating a glass electrode for measuring the pH value. A nitrogen atmosphere is maintained within the reaction vessel. 80 grams of cuprous chloride and then 530 grams of 96% propargyl alcohol are added to this solution. The mixture is heated to 80–85° C. (pH value of the mixture 3.2). An approximately 45% caustic soda solution is added dropwise from a dropping funnel until the pH value of the reaction mixture has reached 8 to 9. 612 grams of allyl chloride are then added dropwise in the course of 9½ hours from another dropping funnel in such manner that only a small amount is condensed in the reflux condenser. The pH value is meanwhile maintained at 8 to 9 by adding caustic soda solution. After 11½ hours the amount of caustic soda solution which is theoretically necessary (320 grams of NaOH) has been added. The reaction mixture is then steam distilled. The distillate, consisting of a layer of an organic substance and a layer of an aqueous solution, is then saturated with sodium chloride. The organic substance is extracted repeatedly with ether. The ether solution is dried over sodium sulphate and the ether is distilled off. The residue is then fractionated. After the first runnings, consisting essentially of allyl alcohol, 579.1 grams of 5-hexene-2-in-1-ol pass over at 74 to 78° C. at 12 mm., i.e. 75.5% of the theoretical (calculated on allyl chloride).

Analysis: Calculated for $C_6H_8O$, mol. wt. 96.12—
Calculated: C, 74.97%; H, 8.39%
Found: C, 74.76%, 74.76%; H, 8.28%; 8.34%

The 5-hexene-2-in-1-ol forms a phenyl urethane melting at 60 to 61° C. after recrystallization from alcohol.

Analysis: Calculated for $C_{13}H_{13}O_2N$, mol. wt. 215.24—
Calculated: C, 72.54%; H, 6.09%; N, 6.51%
Found: C, 72.65%; H, 6.40%; N, 6.60%, 6.78%

In order to confirm the constitution of the product, 10 grams of the above 5-hexene-2-in-1-ol in 30 cc. of absolute ether were catalytically hydrogenated at 20° C. in the presence of palladium black. In 9½ hours, 8875 cc. of hydrogen were taken up (theoretical: 7520 cc.). In the subsequent distillation, after a first running (B.P. 63 to 67° C. at 757 mm., $n_D^{20}$: 1.3720) probably consisting of n-hexane, 2 grams of n-hexanol were obtained (B.P. 60 to 65° C. at 13 mm., $n_D^{20}$: 1.4220).

Phenyl urethane (M.P. 41 to 42° C.) and 3.5-dinitrobenzoic acid ester (M.P. 58–58.5° C.) were prepared from this hexanol. These two derivatives did not show any lowering of the melting point when the mixed melting point was determined with the corresponding derivatives which were prepared from n-hexanol of different origin.

50 grams of 5-hexene-2-in-1-ol obtained according to the above process are dissolved in 150 grams of tetrahydrofurane and hydrogenated in the presence of 10 grams of Raney-nickel at room temperature and a hydrogen pressure of 100 atü. 43.8 grams of n-hexanol (82% of the theoretical) are thus obtained. (B.P. 66 to 66.5 at 14 mm., $n_D^{20}$: 1.4191.)

Example 2

In accordance with the process as described in Example 1, 135 grams of allyl chloride were added dropwise in the course of 6 hours to a mixture of 750 cc. of sodium chloride solution, 20 grams of cuprous chloride and 132 grams of propargyl alcohol (95%) and a pH value of 8 to 9 was maintained by addition of an approximately 40% caustic soda solution.

The amount of 5-hexene-2-in-1-ol obtained was 150.3 grams=78% of the theoretical (calculated on the allyl chloride introduced).

The influence of the pH value of the reaction mixture on the yield of 5-hexene-in-1-ol is shown from the following table, when the pH value as shown in each case is maintained throughout the reaction period:

| pH | Yield (mean values), percent |
| --- | --- |
| 2.9–3.2 | — |
| 3.9–4 | 6–7 |
| 5–6 | 16 |
| 7–8 | 19 |
| 8–9 | 47 |
| | 78 |

Example 3

20 grams of cuprous chloride and 95 grams of anhydrous sodium carbonate are added to a solution of 104 grams of 96% propargyl alcohol in 300 cc. of acetone. The mixture is heated to 60° C. while stirring. Over a period of about 30 hours, 137 grams of allyl chloride are added dropwise and the mixture is heated for a further 5 hours. The salt is then filtered off with suction and the filter residue is washed with acetone. The acetone is distilled off from the filtrate, the residue is dissolved in ether and the ethereal solution is washed several times with weakly acidified saturated sodium chloride solution. After drying over sodium sulphate, the ether is distilled off and the residue is fractionated. 93.3 grams of 5-hexene-2-in-1-ol are obtained=54% of the theoretical (calculated on allyl chloride).

If the same amount of benzene is used as diluent instead of acetone 82.6 grams (48% of the theoretical) of 5-hexene-2-in-1-ol are obtained after heating for 21 hours.

Example 4

A mixture of 300 cc. of saturated sodium chloride solution and 55 grams of cuprous chloride is heated at 60° C. in a nitrogen atmosphere. A solution of 50 grams of phenyl acetylene in 150 cc. of benzene is then added while stirring and this mixture is mixed with a solution of 19 grams of sodium hydroxide in 60 cc. of water. The copper compound of phenyl acetylene is precipitated, this being partly deposited on the wall of the vessel. 50 grams of allyl chloride are added dropwise over a period of 1½ hours at a temperature of 68° C. The phenyl acetylene copper gradually enters into solution. The vessel is then heated for another half hour at 75° C. and the reaction mixture is steam distilled. The aqueous phase of the distillate is saturated with sodium chloride and the oily phase is extracted with ether. After drying the ether extract over sodium sulphate, the ether is distilled off and the residue is fractionated. After a first running of unchanged phenyl acetylene (29.2 grams) there is obtained a colorless liquid ($n_D^{20}$=1.5584) which boils at 88 to 89° C. at 11 mm. and which constitutes 1-phenyl-4-pentene-1-in(phenyl-allyl-acetylene). The yield is 18.3 grams (26% of the theoretical), calculated on the phenyl acetylene introduced and 66% of the theoretical after deducting the recovered phenyl acetylene.

For the purpose of confirming the constitution of the product, 10 grams of phenyl-allyl-acetylene are heated for one hour under reflux with dilute sulphuric acid, mercuric sulphate and methanol. 10.1 grams of 1-phenyl-4-pentene-1-one (allyl acetophenone) are obtained in the working up operation. The derivatives (semi-carbazone, M.P. 157 to 158° C. oxime, M.P. 51 to 52° C.) which are prepared from this substance have a melting point in accordance with the data given in literature.

Example 5

49 grams of phenyl acetylene are added to a mixture of 500 cc. of saturated sodium chloride solution, 250 cc. of ethanol and 10 grams of cuprous chloride (pH 3.2). The mixture is heated at 80° C. and adjusted to a pH value of 8 to 9 by the addition of a few cc. of an approximately 30% caustic soda solution. 37 grams of allyl chloride are now added dropwise over a period of 1½ hours. At the same time, the pH value of the reaction mixture is maintained at 8 to 9 by addition of caustic soda solution. 55 cc. of caustic soda solution (=16 grams of NaOH) are added dropwise after 7 hours. The reaction mixture is steam distilled, the distillate is saturated with sodium chloride and the oil is separated by repeated extraction with ether. The ethereal solution is dried over sodium sulphate and then concentrated by evaporation. In the fractional distillation, after a first running consisting essentially of allyl alcohol, the residue produces 27.3 grams of unreacted phenyl acetylene and 20.1 grams of phenyl-allyl-acetylene. The yield is 29.5% of the theoretical, calculated on the amount of phenyl acetylene which is introduced and 66.5% of the theoretical, based on reacted phenyl acetylene.

Example 6

In accordance with the process described in Example 1, 80 grams of cuprous chloride are dissolved in 500 cc. of saturated sodium chloride solution, 375 grams of 95% propargyl alcohol are added. The above mixture is then reacted with 500 grams of methallyl chloride at a pH value of 8 to 9 and at a temperature of 75 to 80° C. The reaction lasts 10½ hours. The working up is carried out as in Example 1. There is obtained a yield of 74% of an alcohol boiling at 90 to 91° C. with a pressure of 15 mm., which appears to be 5-methyl-hex-5-en-2-in-1-ol.

$d_4^{20}$ 0.9201; $n_D^{20}$ 1.4771. Mean value, calc. 33.77. Mean value, found 33.89.

Analysis: $C_7H_{10}O$, molecular weight 110.15—
 Calculated: C, 76.32%; H, 9.15%
 Found: C, 75.62%; H, 9.27%

The phenyl urethane (recrystallized from alcohol) M.P. 74 to 75° C.

Analysis: $C_{14}H_{15}O_2N$, molecular weight 229.27—
 Calculated: C, 73.34%; H, 6.59%; N, 6.11%
 Found: C, 73.20%; H, 6.35%; N, 6.40%

In order to confirm the constitution of the product, 50 grams of the above 5-methyl-hex-5-en-2-in-1-ol dissolved in 150 grams of tetrahydrofurane are hydrogenated in the presence of 10 grams of Raney-nickel at 20 to 51° C. and a hydrogen pressure of 50 atmospheres. Thus, 49.4 grams (92 of the theoretical) of 5-methyl-hexane-1-ol are obtained. B.P. 74 to 78° C., at 14 mm. $n_D^{20}$: 1.4268. The phenyl urethane melts at 81.5° C. (recrystallized from gasoline).

Example 7

125 grams of cuprous chloride and 400 grams of propargyl alcohol are added to 750° cc. of saturated sodium chloride solution. The mixture is heated to 40 to 45° C. The pH value of the mixture is then adjusted to 7.5 to 8.5 by adding an approximately 40% caustic soda solution. Over a period of 10 hours, 500 grams of 1-chloro-2-butene (crotyl chloride) are added dropwise, the pH of the reaction mixture being maintained at the value indicated above by constantly adding caustic soda solution. After 12½ hours, the reaction mixture is steam distilled. The distillate, consisting of an aqueous solution on which a layer of oil is floating, is saturated with sodium chloride. The oil layer is extracted with ether, the ether solution is dried with sodium sulphate and the ether is distilled off. From the residue which is left there is obtained, after removal of the first runnings, a liquid boiling at 83–107° C. at a pressure of 18 mm. $n_D^{20}$ 1.4742. The yield is 56%.

This product is separated into two fractions by fractionation on a tall Raschig ring column:

Fraction I: B.P. 80 to 84° C. at 15 mm. $n_D^{20}$ 1.4688
Fraction II: B.P. 96 to 98° C. at 17 mm. $n_D^{20}$ 1.4799.

The first fraction yields a phenyl urethane melting at 63 to 64° C.

Analysis: $C_{14}H_{15}O_2N$, molecular weight 229.27—
Calculated: C, 73.34%; H, 6.59%
Found: C, 73.80%; H, 6.55%

A phenyl urethane melting at 68 to 69° C. was obtained from the second fraction.

Analysis: $C_{14}H_{15}O_2N$, molecular weight 229.27—
Calculated: C, 73.34%; H, 6.59%; N, 6.11%
Found: C, 73.55%; H, 6.55%; N, 6.22%, 6.16%

Mixed melting point of the two phenyl urethanes: 46 to 52° C.

Thus, the reaction of crotyl chloride with propargyl alcohol gives a mixture of two alcohols, which have the following constitution:

$$CH_2=CH-\underset{\underset{CH_3}{|}}{CH}-C\equiv C-CH_2-OH$$

and $$CH_3-CH=CH-CH_2-C\equiv C-CH_2-OH$$

In order to confirm the constitution of the product, 50 grams of fraction I dissolved in 150 grams of tetrahydrofurane are hydrogenated in the presence of 10 grams of Raney-nickel at 50° C. and a hydrogen pressure of 100 atmospheres. 44.1 grams (84% of the theoretical) of 4-methyl-5-hexane-1-ol are obtained. B.P. 78.5° C., at 15 mm. $n_D^{20}$: 1.4258. The α-naphthyl urethane of this alcohol melts at 51 to 52° C. (recrystallized from petroleum ether). A. Dewael and A. Weckering have found for the α-naphthyl urethane of the 4-methylhexane-1-ol a melting point of 50° C.

If the hydrogenation is carried out with 50 grams of fraction II 45.2 grams (86% of the theoretical) of n-heptanol are obtained. B.P. 80° C. at 14 mm., $n_D^{20}$: 1.4241, the phenyl urethane having a melting point of 58 to 58.5° C. A mixed melting point of the thus obtained phenyl urethane obtained of the commercial n-heptanol did not show any lowering of the melting point.

The same mixture of 4-methyl-5-hexen-2-in-1-ol and 5-hepten-2-in-1-ol is obtained by reacting 534 grams of 2-chloro-3-butene (α-methyl-allylchloride) with 375 grams of propargyl alcohol by following the procedure of the above example. The yield is 413.3 grams (64% of the theoretical). B.P. of the mixture: 82 to 95° C. at 12 mm., $n_D^{20}$: 1.4738.

Instead of the pure 1-chloro-2-butene respectively 2-chloro-3-butene the technical mixture can be used such as obtained by the addition of hydrogen chloride on butadiene.

Example 8

550 cc. of water, 80 grams of cuprous chloride and 420 grams of propargyl alcohol are heated to 80 to 85° C. The pH value of the mixture is adjusted to 8 to 9 by addition of 40% of caustic soda solution. 400 grams of 1:4-dichloro-2-butene and 250 cc. of ethyl alcohol (as diluent) are then added dropwise. The pH of the mixture is maintained at the adjusted value by constant addition of caustic soda solution. When the reaction has terminated, the reaction mixture is filtered off from the solid constituents and the filter residue is washed with alcohol. The filtrate consists of an aqueous solution on which floats a layer of oil. By heating the filtrate at reduced pressure, the ethyl alcohol is distilled off. The remaining mixture is extracted with chloroform, the oil layer being dissolved. The aqueous layer is run off. The chloroform solution is washed several times with slightly acidified sodium chloride solution and is thereafter dried with sodium sulphate. The solvent is then distilled off. The residue which remains is 331 grams=63% of the theoretical and represents an undistillable thick brownish oil from which a substance is crystallized out by standing for a relatively long time. These crystals are then filtered with suction and recrystallized several times from water and then from a mixture of benzene with a little ethyl alcohol. They then melt at 94 to 95° C. This substance appears to be deca-5-en-2.8-diin-1-10-diol.

$$HO-CH_2-C\equiv C-CH_2-CH=CH-CH_2-C\equiv C-CH_2-OH.$$

Analysis: $C_{10}H_{12}O_2$, molecular weight 164.2—
Calculated: C, 73.14%; H, 7.37%; O, 19.48%
Found: C, 73.30%; H, 7.35%; O, 19.67%

By catalytic hydrogenation of the crude product in tetrahydrofuran solution with Raney nickel as catalyst and hydrogen under pressure, a crystalline substance is obtained as well as liquid substances, the said crystalline substance melting at 72 to 73° C. after recrystallization and not showing any lowering of the melting point when the mixed melting point was determined with decamethylene glycol (M.P. 72 to 73° C.).

Example 9

100 grams of cuprous chloride are dissolved in 750 cc. of saturated sodium chloride solution in a nitrogen atmosphere in a flask provided with a reflux condenser. Acetylene is now passed with a flow velocity of 8 to 10 liters per hour through this mixture at 70 to 80° C., thus expelling the nitrogen. The pH value of the mixture is adjusted to 8 to 9 by addition of an approximately 40% caustic soda solution. The reddish-violet copper acetylide is formed. 180 grams of methallyl chloride are added dropwise to this mixture over a period of 6 hours and the adjusted pH value is maintained by adding further caustic soda solution. After 12 hours, the absorption of acetylene is 24 liters (measured as the difference of the acetylene which is introduced and the acetylene which leaves as waste gas). At this stage the reaction is stopped and the reaction mixture is steam distilled. The oil layer is separated from the aqueous distillate and dried over sodium sulphate. Two fractions are obtained by fractional distillation, these being:

Fraction I: B.P. 60 to 71° C. at 759 mm.
Fraction II: B.P. 66 to 71° C. at 16 mm.

The first fraction contains halogen and is a mixture of unreacted methallyl chloride and an acetylene hydrocarbon, which latter produces a yellow precipitation with ammoniacal cuprous chloride solutions. The acetylene hydrocarbon should constitute 2-methyl-pent-1-en-4-in.

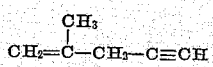

Upon being distilled again, fraction II boils at 73 to 74° C. at 19 mm. ($d_4^{20}$ 0.7245; $n_D^{20}$ 1.4663) and contains an unsaturated hydrocarbon which very readily absorbs oxygen from air.

Analysis shows a value of $C_{10}H_{14}$: molecular weight 134.12—
   Calculated: C, 89.49%; H, 10.51%
   Found: C, 89.10%; H, 10.34%

*Example 10*

When allyl chloride, instead of methallyl chloride, is reacted with acetylene, using the working method described in Example 9, two reaction products are obtained. The first product boils at 40 to 45° C., at a pressure of 766 mm. and consists of a mixture of unchanged allyl chloride and an acetylene hydrocarbon forming a yellow precipitate with ammoniacal cuprous chloride solution. The second product boils at 56 to 56.5° C. at a pressure of 41 mm. ($n_D^{20}$: 1.4600).

I claim:

1. Process for the production of allyl substituted acetylene compounds which comprises contacting a compound having the general formula RC≡CH in which R is a member selected from the group consisting of hydrogen, hydrocarbon radicals and hydrocarbon radicals substituted with an OH group at a temperature between about 30° and 150° C. in an aqueous medium, with a member selected from the group consisting of allyl chlorides and allyl bromides, in the presence of a cuprous compound, neutralizing the halogen halide formed during the reaction, and recovering the allyl substituted acetylene compound formed.

2. Process for the production of allyl substituted acetylene compounds which comprises contacting a compound having the general formula RC≡CH in which R is a member selected from the group consisting of hydrogen, hydrocarbon radicals, and hydrocarbon radicals substituted with an OH group, at a temperature between about 30° and 150° C. in an aqueous medium, with a member selected from the group consisting of allyl chlorides and allyl bromides, in the presence of a cuprous compound, and recovering the allyl substituted acetylene compound formed.

3. Process according to claim 2 in which said aqueous medium does not have a pH below 7.

4. Process according to claim 3 in which the aqueous medium is an aqueous alkaline solution of a sodium salt.

5. Process according to claim 4 in which said cuprous compound is cuprous chloride.

6. Process according to claim 2 in which said cuprous compound is cuprous chloride.

7. Process according to claim 2 in which said contacting is effected in the additional presence of an organic solvent.

8. Process according to claim 7 in which organic solvent is a member selected from the group consisting of alcohol and acetone.

9. Process for the production of 5-hexene 2-yne 1-ol which comprises contacting propargyl alcohol with allyl chloride at a temperature above about 70° C. in an aqueous salt solution having a pH between about 8 and 9 in the presence of cuprous chloride and recovering the 5-hexene 2-yne 1-ol formed.

10. Process for the production of allyl substituted acetylene compounds which comprises contacting acetylene with methallyl chloride at a temperature above about 70° C. in an aqueous salt solution having a pH between about 8 and 9 and in the presence of cuprous chloride and recovering the allyl substituted acetylene compound formed.

References Cited in the file of this patent

UNITED STATES PATENTS 1,682,062   Bockmuhl et al. _____ Aug. 28, 1928

OTHER REFERENCES

Lespieau et al.: Bull. Soc. Chim. (France) (4), vol. 49, pp. 423–5 (1931).

Grignard et al.: Académie des Sciences (France), Compte rendus, vol. 192, pp. 250 3 (1931).

Nieumland et al.: The Chemistry of Acetylene, Reinhold, New York, 1945; pp. 40–61.

Johnson: Acetylenic Compounds, vol. 1 (1946). Arnold, London; p. 277.